United States Patent
Jiang et al.

(10) Patent No.: US 12,199,887 B2
(45) Date of Patent: Jan. 14, 2025

(54) INFORMATION PROCESSING METHOD, ETHERNET SWITCHING CHIP AND STORAGE MEDIUM

(71) Applicant: SUZHOU CENTEC COMMUNICATIONS CO., LTD., Jiangsu (CN)

(72) Inventors: Zhen Jiang, Jiangsu (CN); Peiyu Fang, Jiangsu (CN); Wei Zhou, Jiangsu (CN); Xinglong Cui, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 426 days.

(21) Appl. No.: 17/792,720

(22) PCT Filed: Sep. 7, 2020

(86) PCT No.: PCT/CN2020/113727
§ 371 (c)(1),
(2) Date: Jul. 14, 2022

(87) PCT Pub. No.: WO2021/147331
PCT Pub. Date: Jul. 29, 2021

(65) Prior Publication Data
US 2023/0050185 A1    Feb. 16, 2023

(30) Foreign Application Priority Data
Jan. 22, 2020   (CN) .......................... 202010075094.4

(51) Int. Cl.
*H04L 12/66*    (2006.01)
*H04L 41/16*    (2022.01)
(Continued)

(52) U.S. Cl.
CPC ............ *H04L 49/109* (2013.01); *H04L 41/16* (2013.01); *H04L 49/351* (2013.01)

(58) Field of Classification Search
CPC ..... H04L 49/109; H04L 49/351; H04L 47/10; H04L 41/5022; H04L 43/026;
(Continued)

(56) References Cited

U.S. PATENT DOCUMENTS

2012/0002546 A1*   1/2012   Sundararaman ...... H04L 49/109
                                                        370/235
2013/0136011 A1    5/2013   Tardo
(Continued)

FOREIGN PATENT DOCUMENTS

CN       1991793 A      7/2007
CN     101193021 A      6/2008
(Continued)

OTHER PUBLICATIONS

International Search Report for corresponding application PCT/CN2020/113727 filed Sep. 7, 2020; Mail date Dec. 9, 2020.

*Primary Examiner* — Kharye Pope
(74) *Attorney, Agent, or Firm* — Samson G. Yu

(57) ABSTRACT

An information processing method, an Ethernet switching chip and a storage medium are provided. The method includes: executing, by a master IP core, one of following operations: updating a global information table of the master IP core according to first information corresponding to the information processing request, and sending the first information to each slave IP core; updating a dedicated information table of the master IP core according to second information corresponding to the information processing request, or, sending, to a corresponding slave IP core, third information corresponding to the information processing request; or acquiring fourth information from the global information table or the dedicated information table of the master IP core
(Continued)

based on the information processing request and sending the fourth information to a processor, or, acquiring fifth information from a corresponding slave IP core and sending the fifth information to the processor.

20 Claims, 3 Drawing Sheets

(51) Int. Cl.
*H04L 49/109* (2022.01)
*H04L 49/351* (2022.01)

(58) Field of Classification Search
CPC ...... H04L 47/12; H04L 47/20; G06F 12/0811; G06F 2212/1016; G06F 12/0864; G06F 15/8069; G06F 11/0724; G06F 9/3004; G06F 11/3024; G06F 13/1668; G06F 2212/222
See application file for complete search history.

(56) References Cited

U.S. PATENT DOCUMENTS

| | | | | |
|---|---|---|---|---|
| 2013/0178528 | A1* | 7/2013 | Deckelbaum | A61K 9/107 514/547 |
| 2015/0058682 | A1* | 2/2015 | Nagumo | G06F 11/0724 714/47.3 |
| 2017/0315944 | A1* | 11/2017 | Mayer | G06F 13/24 |
| 2018/0097747 | A1* | 4/2018 | Gauffriau | H04L 67/12 |
| 2018/0124011 | A1 | 5/2018 | Wang | |

FOREIGN PATENT DOCUMENTS

| | | |
|---|---|---|
| CN | 101651627 A | 2/2010 |
| CN | 101964753 A | 2/2011 |
| CN | 102611519 A | 7/2012 |
| CN | 104102535 A | 10/2014 |
| CN | 107819705 A | 3/2018 |
| CN | 108134855 A | 6/2018 |
| CN | 109257190 A | 1/2019 |
| CN | 111343107 A | 6/2020 |

* cited by examiner

INFORMATION PROCESSING METHOD, ETHERNET SWITCHING CHIP AND STORAGE MEDIUM

CROSS-REFERENCE TO RELATED APPLICATION

The present disclosure is a National Stage Filing of PCT International Application No. PCT/CN2020/113727 filed on Sep. 7, 2020, which is based on and claims the priority to Chinese Patent Application No. 202010075094.4, filed on Jan. 22, 2020, and the entire contents of which are incorporated herein by reference.

TECHNICAL FIELD

The present disclosure relates to an Ethernet data exchange technology, and in particular to an information processing method, an Ethernet switching chip and a storage medium.

BACKGROUND

With the development of technologies such as ultra-large-scale cloud networks, storage networks, and High Performance Computing (HPC), the data interaction volume on the network is greater and greater, and the data processing capability of a single chip is also continuously improved from an order of magnitude of Giga Bits Per Second (Gbps) to an order of magnitude of Tera Bits Per Second (Tbps). However, the size of a single chip manufactured by the current production process is 14 nm/12 nm or 7 nm/6 nm, and an Intellectual Property core (IP core) of a single chip can run at a clock frequency up to 1.05 GHz or 1.7 GHz, respectively. A single chip with only one IP core cannot meet the requirements for a message processing bandwidth of up to 25.6 Tbps in the chip market. From the perspective of manufacturing engineering, in order to meet the requirements for the message processing bandwidth in the chip market, when the clock frequency of a single chip with a single IP core is limited, it is very necessary to design a single chip with dual IP cores or a plurality of IP cores.

However, in related arts, it is still necessary to optimize an information processing method of a single chip with dual cores or a plurality of cores.

SUMMARY

In view of this, embodiments of the present disclosure provide an information processing method, an Ethernet switching chip and a storage medium.

The technical solutions of the embodiments of the present disclosure are implemented as follows.

The embodiments of the present disclosure provide an information processing method, including:
  receiving, by a master IP core of an Ethernet switching chip, an information processing request, wherein the master IP core is an IP core in at least two IP cores contained in the Ethernet switching chip; and
  executing, by the master IP core, one of following operations based on the received information processing request:
  updating a global information table of the master IP core according to first information corresponding to the information processing request, and sending the first information to each slave IP core of the Ethernet switching chip, so that the slave IP core updates a global information table of the slave IP core according to the first information, wherein the received information processing request is from a processor of a switch that is provided with the Ethernet switching chip, or is from a slave IP core of the Ethernet switching chip;
  updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information, wherein the received information processing request is from the processor, or is from the slave IP core of the Ethernet switching chip; or
  acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the fifth information is information, which corresponds to the information processing request, in the dedicated information table of the corresponding slave IP core;
  wherein the slave IP core is an IP core in the at least two IP cores except the master IP core; the global information table is used for storing information associated with all IP cores of the Ethernet switching chip; and the dedicated information table is used for storing information associated with one IP core of the Ethernet switching chip.

In the above solution, the method further includes:
  judging, by the master IP core, an IP core associated with the information processing request according to a first preset strategy, so as to obtain a first judgment result; and
  executing a corresponding operation according to the first judgment result and based on the received information processing request.

In the above solution, the information processing request is a message information learning request sent by a slave IP core; the method further includes:
  executing, by the master IP core in response to the received message information learning request, a self-learning operation corresponding to the message information learning request, so as to obtain a message information learning result;
  in a case where the first judgment result indicates that the message information learning request is associated with all IP cores of the Ethernet switching chip, determining, by the master IP core, the message information learning result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information; and
  in a case where the first judgment result indicates that the message information learning request is associated with a slave IP core of the Ethernet switching chip, determining, by the master IP core, the message information learning result to serve as the second information, and sending, by the master IP core, the second information to the corresponding slave IP core, so that the corresponding slave IP core updates the dedicated information table of the corresponding slave IP core according to the second information.

In the above solution, the slave IP core sends the message information learning request to the master IP core in a case where one of following conditions is met:
the slave IP core does not find, from the global information table or the dedicated information table of the slave IP core, a message processing strategy corresponding to a received message; or
the slave IP core fails to perform corresponding processing on the received message according to the message processing strategy, which corresponds to the received message and is found from the global information table or the dedicated information table of the slave IP core.

In the above solution, the information processing request is an information updating request sent by the processor; the method further includes:
parsing the information updating request to obtain a parsing result;
in a case where the first judgment result indicates that the information updating request is associated with all IP cores of the Ethernet switching chip, determining, by the master IP core, the parsing result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information;
in a case where the first judgment result indicates that the information updating request is associated with the master IP core of the Ethernet switching chip, determining, by the master IP core, the parsing result to serve as the second information, and updating, by the master IP core, a dedicated information table of the master IP core according to the second information; and
in a case where the first judgment result indicates that the information updating request is associated with a slave IP core of the Ethernet switching chip, determining, by the master IP core, the parsing result to serve as the third information, and sending, by the master IP core, the third information to the corresponding slave IP core, so that the corresponding slave IP core updates the dedicated information table of the corresponding slave IP core according to the third information.

In the above solution, the information processing request is an information reading request sent by the processor; the method further includes:
in a case where the first judgment result indicates that the information reading request is associated with all IP cores of the Ethernet switching chip, determining, by the master IP core based on the information reading request, information, which is acquired from the global information table of the master IP core and corresponds to the information reading request, to serve as the fourth information, and sending, by the master IP core, the fourth information to the processor;
in a case where the first judgment result indicates that the information reading request is associated with the master IP core of the Ethernet switching chip, determining, by the master IP core based on the information reading request, information, which is acquired from the dedicated information table of the master IP core and corresponds to the information reading request, to serve as the fourth information, and sending, by the master IP core, the fourth information to the processor; and
in a case where the first judgment result indicates that the information reading request is associated with a slave IP core of the Ethernet switching chip, sending, by the master IP core, the information reading request to the corresponding slave IP core, so as to acquire fifth information that is returned by the corresponding slave IP core in response to the information reading request, and sending, by the master IP core, the fifth information to the processor.

In the above solution, the method further includes:
performing, by the master IP core, information interaction with each slave IP core via a first interface provided on the master IP core and a second interface provided on each slave IP core.

The embodiments of the present disclosure further provide an Ethernet switching chip. The Ethernet switching chip includes at least two IP cores; one IP core in the at least two IP cores is a master IP core; one or more IP cores in the at least two IP cores except the master IP core are slave IP cores; wherein
the master IP core is configured to:
receive an information processing request;
execute one of following operations based on the received information processing request:
updating a global information table of the master IP core according to first information corresponding to the information processing request, and sending the first information to each slave IP core of the Ethernet switching chip, so that the slave IP core updates a global information table of the slave IP core according to the first information, wherein the received information processing request is from a processor of a switch that is provided with the Ethernet switching chip, or is from a slave IP core of the Ethernet switching chip;
updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information, wherein the received information processing request is from the processor, or is from the slave IP core of the Ethernet switching chip; or
acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the fifth information is information, which corresponds to the information processing request, in the dedicated information table of the corresponding slave IP core;
wherein the global information table is used for storing information associated with all IP cores of the Ethernet switching chip; and the dedicated information table is used for storing information associated with one IP core of the Ethernet switching chip.

The embodiments of the present disclosure further provide an Ethernet switching chip, including: a processor, and a memory configured to store a computer program executable on the processor;

wherein the processor is configured to execute the operations of any one of the above methods when running the computer program.

The embodiments of the present disclosure further provide a storage medium, wherein a computer program is stored in the medium, and when executed by a processor, the computer program implements the operations of any one of the above methods.

In the technical solutions provided by the embodiments of the present disclosure, the master IP core of the Ethernet switching chip receives the information processing request, and executes one of the following operations based on the received information processing request: updating a global information table of the master IP core according to the first information corresponding to the information processing request, and sending the first information to each slave IP core of the Ethernet switching chip, so that the slave IP core updates a global information table of the slave IP core according to the first information; updating a dedicated information table of the master IP core according to the second information corresponding to the information processing request, or, sending, to the corresponding slave IP core, the third information corresponding to the information processing request, so that the corresponding slave IP core updates a dedicated information table of the corresponding slave IP core according to the third information; or acquiring, based on the information processing request and from the global information table or the dedicated information table of the master IP core, the fourth information corresponding to the information processing request and sending the fourth information to the processor, or, acquiring the fifth information from a corresponding slave IP core and sending the fifth information to the processor. Herein, the master IP core is an IP core in the at least two IP cores contained in the Ethernet switching chip; and the slave IP core is an IP core in the at least two IP cores except the master IP core. The information processing request received by the master IP core is from the processor, or is from the slave IP core of the Ethernet switching chip. The processor is a processor of a switch that is provided with the Ethernet switching chip. The global information table is used for storing the information associated with all IP cores of the Ethernet switching chip; and the dedicated information table is used for storing the information associated with one IP core of the Ethernet switching chip. The fifth information is information, which corresponds to the information processing request, in the dedicated information table of the corresponding slave IP core. In the solutions of the embodiments of the present disclosure, a master-slave mode is configured for the at least two IP cores contained in the Ethernet switching chip. The master IP core performs communication with the processor of the switch that is provided with the Ethernet switching chip, and implements the synchronous update of the global information tables of the master IP core and each slave IP core. In this way, the operations of the IP cores in a dual-core or multi-core Ethernet switching chip generate no conflict, which further enables external system behaviors of the dual-core or multi-core Ethernet switching chip to be the same as those of a single-core Ethernet switching chip.

DETAILED DESCRIPTION OF THE EMBODIMENTS

Figure 1:
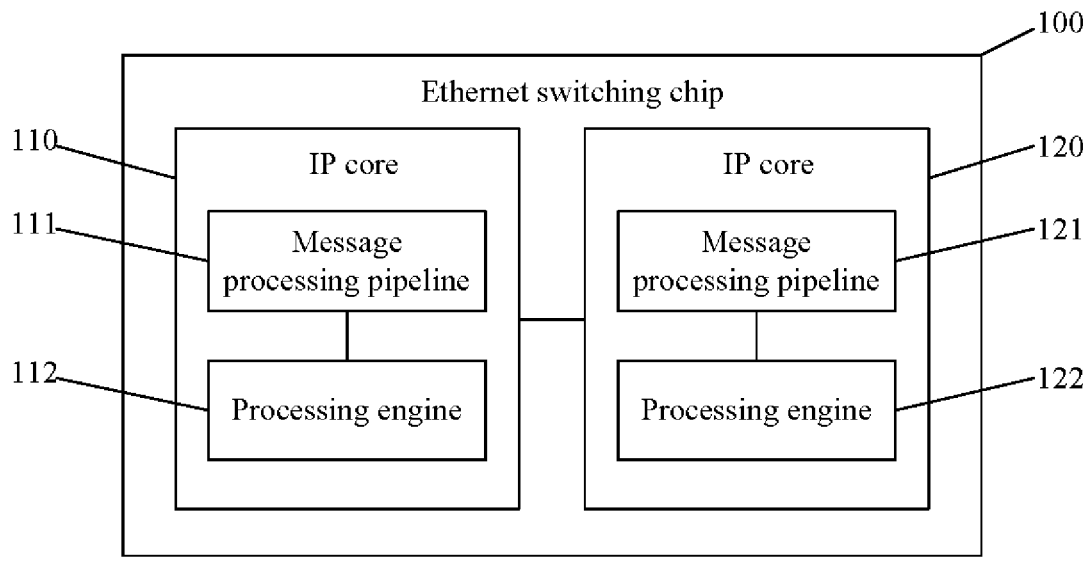
FIG. 1 is a schematic structural diagram of a dual-core Ethernet switching chip in a related art.

The technical solutions of the present disclosure will be described in further detail below in conjunction with the drawings and embodiments.

With the advancement of chip production process, the cost of Tape out is getting higher and higher. In order to enrich product lines on the premise of saving the cost, it is necessary to design and produce high-bandwidth (single-core) and ultrahigh-bandwidth (dual-core or multi-core) Ethernet switching chips in one Tape out. Since one IP core may be packaged on each Die, by using a Die to Die (D2D) technology, one Tape out can cover a plurality of product lines: a single-core Ethernet switching chip is packaged by one Die; and a dual-core or multi-core Ethernet switching chip is packaged by two or more Dies. Herein, in order to support that various IP cores contained in the dual-core or multi-core Ethernet switching chip may be separated and packaged into two or more different Ethernet switching chips which work independently, and may also be combined and packaged into one chip, the structures of the various IP cores are exactly the same. With regard to the dual-core or multi-core Ethernet switching chip, from the application perspective of the chip, a system behavior displayed by the chip at work should not make other terminals or servers perceive whether the chip architecture is a single-core or dual-core or multi-core design (for example, the other terminals or servers perceive that messages forwarded by the IP cores of the chip are conflicting or have inconsistent time delays). Therefore, information synchronization among the IP cores is very necessary. Specifically, when processing a message, the Ethernet switching chip needs to maintain a message processing information table (i.e., update the message processing information table). The message processing information table is stored in the IP core, so that the IP core queries a message processing strategy corresponding to the received message, and performs corresponding processing (for example, forwarding, discarding, and so on) on the received message by using the found message processing strategy. For the IP core of a single-core Ethernet switching chip, the message processing information table is a public resource, that is, after receiving the message, all interfaces of the IP core query the same message processing information table when querying a message forwarding strategy corresponding to the received message, and the IP core may maintain the message processing information table stored by the IP core. However, for each IP core in at least two IP cores of a dual-core or multi-core Ethernet switching chip, the IP core not only stores message processing information tables that are strongly related to the interface of the IP core, such as an interface attribute information table, but also stores message processing information tables that are weakly related to the interface of the IP core, such as an Ethernet layer-2 bridge message Forward Database (FDB). Herein, the message processing information tables that are strongly related to the interface of the IP core are only stored in a corresponding IP core, and the message processing information tables that are weakly related to the interface of the IP core are stored in each IP core. Therefore, the message processing information tables that are strongly related to the interface of the IP core may be internally maintained by the corresponding IP core without informing other IP cores; and the message processing information tables that are weakly related to the interface of the IP core need to be maintained synchronously by all IP cores. The message processing information tables, which are stored in the IP cores and need to be maintained synchronously, should be consistent. However, since the Ethernet switching chip is produced by one Tape out covering a plurality of product lines, the IP cores are individually packaged, that is, there is no shared common resource area between the IP cores to support an inter-operation that is performed for synchronously maintaining the message processing information tables.

Taking the dual-core Ethernet switching chip shown in FIG. 1 as an example, an Ethernet switching chip 100 contains an IP core 110 and an IP core 120. A message processing pipeline 111 and a message processing pipeline 121 are configured to perform corresponding processing on received messages according to message processing information tables stored in the IP cores where the message processing pipelines 111 and 121 are located, and perform corresponding processing on the received messages according to the stored message processing information tables. A processing engine 112 and a processing engine 122 are configured to update the message processing information tables of the IP cores where the processing engines 112 and 122 are located (in practical applications, the message processing information tables may also be updated by the message processing pipelines or a processor of a switch that is provided with the Ethernet switching chip, and an illustration is only given herein for the case in which the processing engines update the message processing information tables). When the Ethernet switching chip 100 needs to forward an Ethernet layer-2 message, if the Ethernet switching chip 100 only contains the IP core 110, the message processing pipeline 111 will query, in the FDB stored in the IP core 110, a message forwarding strategy of a to-be-forwarded message. If the message processing pipeline 111 does not find the message forwarding strategy of the to-be-forwarded message in the FDB, then the message processing pipeline 111 sends a message information learning request of the to-be-forwarded message to the processing engine 112, so as to trigger a self-learning operation of the processing engine 112, so that the processing engine 112 obtains a message information learning result of the to-be-forwarded message; the processing engine 112 determines the message forwarding strategy of the to-be-forwarded message based on the obtained message information learning result, and adds the message forwarding strategy into the FDB of the IP core 110, so that the message processing pipeline 111 subsequently performs forwarding processing on other received messages. However, the Ethernet switching chip 100 further contains the IP core 120. Since the FDB is a message processing information table that needs to be synchronously maintained by the IP core 110 and the IP core 120, the processing engine 112 determines the forwarding strategy of the to-be-forwarded message based on the obtained message information learning result, and adds the forwarding strategy into the FDB stored in the IP core 110, and meanwhile, the processing engine 112 also needs to send the obtained message information learning result to the processing engine 122, so that the processing engine 122 adds the corresponding message forwarding strategy into the FDB stored in the IP core 120. At this time, if the processing engine 122 of the IP core 120 receives the message information learning request of the message processing pipeline 121 and performs a self-learning operation, it is also needed to add the determined forwarding strategy of another to-be-forwarded message into the message processing pipeline 121, and the message processing pipeline 121 needs to update the FDB twice at the same time, and the two updates may be conflicting (for example, when the FDB is stored in a Hash manner, the forwarding strategy writing locations of the two to-be-forwarded messages of the FDB of the message processing pipeline 121 may be conflicting).

Based on this, in various embodiments of the present disclosure, a master-slave mode is configured for at least two IP cores contained in the Ethernet switching chip, a master IP core performs communication with the processor of the switch that is provided with the Ethernet switching chip, and implements synchronous update of global information tables of the master IP core and each slave IP core. In this way, the operations of the IP cores in the dual-core or multi-core Ethernet switching chip generate no conflict, which further enables external system behaviors of the dual-core or multi-core Ethernet switching chip to be the same as those of the single-core Ethernet switching chip.

It should be noted that, in various embodiments of the present disclosure, the message processing information table that needs to be maintained in one IP core is a dedicated information table of the IP core, and the message processing information table that needs to be maintained synchronously by all IP cores is a global information table of each IP core. The global information table and the dedicated information table of one IP core are collectively referred to as the message processing information table of the IP core.

Figure 2:
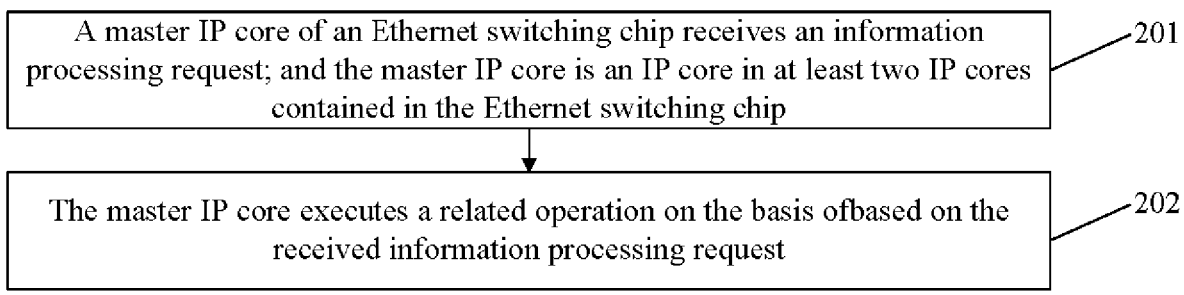
FIG. 2 is a schematic flow diagram of an information processing method according to an embodiment of the present disclosure.

The embodiments of the present disclosure provide an information processing method. As shown in FIG. 2, the method includes the following operations.

At operation 201, a master IP core of an Ethernet switching chip receives an information processing request.

Herein, the master IP core herein is an IP core in at least two IP cores contained in the Ethernet switching chip.

At operation 202, the master IP core executes a related operation based on the received information processing request.

Specifically, the master IP core executes one of following operations based on the received information processing request:

updating a global information table of the master IP core according to first information corresponding to the information processing request, and sending the first information to each slave IP core of the Ethernet switching chip, so that the slave IP core updates a global information table of the slave IP core according to the first information, wherein the received information processing request is from a processor of a switch that is provided with the Ethernet switching chip, or is from a slave IP core of the Ethernet switching chip;

updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information, wherein the received information processing request is from the processor, or is from the slave IP core of the Ethernet switching chip; or acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the fifth information is information, which corresponds to the information processing request, in the dedicated information table of the corresponding slave IP core.

Herein, the slave IP core is an IP core in the at least two IP cores except the master IP core. The global information table is used for storing information associated with all IP cores of the Ethernet switching chip; and the dedicated information table is used for storing information associated with one IP core of the Ethernet switching chip.

Specifically, the global information table is used for storing information associated with all IP cores of the Ethernet switching chip, which means that the global information table is a message processing information table that needs to be maintained synchronously by all IP cores of the Ethernet switching chip, for example, message forwarding information tables such as an FDB, an Ethernet layer-3 Routing Information Base (RIB), a Multi-Protocol Label Switching (MPLS), and an Incoming Label Map (ILM); and as another example, public resource information tables such as a time synchronization counter information table and a bandwidth evaluation information table, and state message processing information tables such as an Aging State Table (AST) corresponding to the FDB. The dedicated information table is used for storing information associated with one IP core of the Ethernet switching chip, which means that the dedicated information table is a message processing information table that needs to be maintained in the corresponding IP core, for example, an interface attribute information table, an index ID contained in the interface attribute information table is an interface ID, and a specified interface for sure belongs to a fixed IP core. In addition, the global information table needs to be maintained synchronously by all IP cores of the Ethernet switching chip, which means that the global information table of each IP core needs to be maintained consistent. In this way, no matter which interface of the Ethernet switching chip receives a message, the corresponding IP core queries the same global information table when querying a message processing strategy corresponding to the received message.

In practical applications, before the master IP core receives the information processing request, that is, before the operation 201 is executed, the master IP core needs to be determined among all IP cores of the Ethernet switching chip.

Based on this, in an embodiment, the method may further include:

configuring an IP core of the Ethernet switching chip to serve as a master IP core, and configuring one or more other IP cores of the Ethernet switching chip except the master IP core to serve as slave IP cores, so as to obtain a master IP core and at least one slave IP core.

In practical applications, a user may configure any IP core of the Ethernet switching chip to serve as the master IP core as needed.

In practical applications, for each IP core of the Ethernet switching chip, the corresponding IP core may include a first processing module and a second processing module. The first processing module is configured to perform corresponding processing (for example, forwarding processing, discarding processing, or modifying a message priority field, and so on) on a received message according to a message processing information table (including the global information table and the dedicated information table) stored in the IP core where the first processing module is stored. The second processing module is configured to update the message processing information table. Take the dual-core Ethernet switching chip 100 shown in FIG. 1 as an example, the first processing module may be the message processing pipeline 111 of the IP core 110 and the message processing pipeline 121 of the IP core 120; and the second processing module may be the processing engine 112 of the IP core 110 and the processing engine 122 of the IP core 120. The corresponding IP core may include a third processing module, and the third processing module is configured to, after the IP core where the third processing module is located is configured to be the master IP core, perform information interaction with the processor via a Peripheral Component Interconnect express (PCIe) bus. When the user configures an original master IP core to be a slave IP core, and configures an original slave IP core to be a new master IP core, the PCIe bus between the third processing module of the original master IP core and the processor may be disconnected, and the third processing module of the new master IP core is connected to the processor via the PCIe bus.

In practical applications, before the master IP core executes a corresponding operation based on the received information processing request, that is, before the operation 202 is executed, the master IP core needs to judge an IP core associated with the information processing request, that is, judge whether the information processing request is directed to the global information table of each IP core, the dedicated information table of the master IP core, or the dedicated information table of the slave IP core. In this way, the master IP core may execute the corresponding operation according to a judgment result.

Based on this, in an embodiment, the method may further include:

judging, by the master IP core, an IP core associated with the information processing request according to a first preset strategy, so as to obtain a first judgment result; and executing a corresponding operation according to the first judgment result and based on the received information processing request.

In practical applications, the first preset strategy may be set by the user as needed, for example, an IP core associated with the information processing request is judged according to an IP core identifier and a message processing information table identifier contained in the information processing request. Of course, the first judgment result may indicate that the information processing request is associated with all IP cores of the Ethernet switching chip, that is, the information processing request is directed to the global information table of each IP core; or, the first judgment result may indicate that the information processing request is associated with the master IP core of the Ethernet switching chip, that is, the information processing request is directed to the dedicated information table of the master IP core; or, the first judgment result may indicate that the information processing request is associated with a slave IP core of the Ethernet switching chip, that is, the information processing request is directed to the dedicated information table of the corresponding slave IP core.

In practical applications, the information processing request received by the master IP core may be a message information learning request sent by a slave IP core.

Based on this, in an embodiment, in a case where the information processing request is a message information learning request sent by a slave IP core, the method may further include:

executing, by the master IP core in response to the received message information learning request, a self-learning operation corresponding to the message information learning request, so as to obtain a message information learning result;

in a case where the first judgment result indicates that the message information learning request is associated with all IP cores of the Ethernet switching chip, determining, by the master IP core, the message information learning result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information; and in a case where the first judgment result indicates that the message information learning request is associated with a slave IP core of the Ethernet switching chip, determining, by the master IP core, the message information learning result to serve as the second information, and sending, by the master IP core, the second information to the corresponding slave IP core, so that the corresponding slave IP core updates the dedicated information table of the corresponding slave IP core according to the second information.

In practical applications, the self-learning operation corresponding to the message information learning request may be the self-learning operation of information such as a source IP address, a source port, a destination IP address, a destination port, and a transport layer protocol. Correspondingly, the message information learning result may include information obtained by the master IP core through the self-learning operation, such as the source IP address, the source port, the destination IP address, the destination port, and the transport layer protocol, and a storage location of the corresponding information in the message processing information table.

In practical applications, the slave IP core may send the message information learning request to the master IP core in a case where one of the following conditions is met:

the slave IP core does not find, from the global information table or the dedicated information table of the slave IP core, a message processing strategy corresponding to a received message; or the slave IP core fails to perform corresponding processing on the received message according to the message processing strategy, which corresponds to the received message and is found from the global information table or the dedicated information table of the slave IP core.

Specifically, in practical applications, in each IP core of the Ethernet switching chip, the first processing module queries, from the message processing information table of the IP core where the first processing module is located, the message processing strategy corresponding to the received message, so as to perform corresponding processing on the received message according to the found message processing strategy. The first processing module sends the message information learning request to the second processing module of the IP core where the first processing module is located in a case where one of the following conditions is met:

the first processing module does not find, from the message processing information table stored by the first processing module, the message processing strategy corresponding to the received message; and the first processing module fails to perform corresponding processing on the received message according to the found message processing strategy.

Since the synchronous update of the global information table in each IP core is implemented by the master IP core, when the second processing module of the slave IP core (which is referred to as a slave module in subsequent descriptions) receives the message information learning request from the first processing module of the IP core where the second processing module is located, the slave module will send the message information learning request to the second processing module of the master IP core (which is referred to as a master module in the subsequent descriptions); that is to say, the master module not only receives the message information learning request sent by the first processing module of the IP core where the master module is located, but also receives the message information learning request sent by the slave module. After receiving the message information learning request, the master module may respond to the message information learning request, and execute a self-learning operation corresponding to the message information learning request, so as to obtain a message information learning result; may update, according to the message information learning result, the message processing information table of the IP core where the master module is located; and/or, send the message information learning result to the corresponding slave module, so that the corresponding slave module updates, according to the message information learning result, the message processing information table of the IP core where the slave module is located.

For example, with regard to the forwarding processing of an Ethernet layer-2 message, in each IP core of the Ethernet switching chip, after receiving the message, the first processing module queries, according to a receiving direction interface attribute when receiving the message and destination address information carried in the received message, a forwarding strategy corresponding to the received message in the FDB of the IP core of the first processing module, so as to perform forwarding processing on the received message. If the first processing module does not find the corresponding forwarding strategy in the FDB, the first processing module needs to send an FDB learning request to the second processing module of the IP core where the first processing module is located, wherein the FDB learning request is used by the second processing module for executing an FDB table entry learning operation corresponding to the FDB learning request, so as to obtain a learning result. The learning result may include: forwarding address information, a destination outbound interface attribute, and a storage location in the FDB of the forwarding strategy corresponding to the learning result. After obtaining the learning result, the second processing module may add, according to the learning result, the corresponding forwarding strategy (i.e., the forwarding address information and the destination outbound interface attribute contained in the learning result) into the FDB according to the storage location, so as to complete the update of the FDB (the second processing module may also return the learning result to the first processing module, and the first processing module completes the update of the FDB). The forwarding strategy updated in the FDB may be used for forwarding subsequent received messages. Since the FDB is a global information table, when receiving the FDB learning request from the first processing module of the IP core where the slave module is located, the slave module also sends the FDB learning request to the master module. The master module not only receives the FDB learning request sent by the first processing module of the IP core where the master module is located, but also receives the FDB learning request sent by the slave module. After receiving the FDB learning request, the master module responds to the FDB learning request, and executes the FDB table entry learning operation corresponding to the FDB learning request, so as to obtain a learning result; updates, by using the learning result, the FDB of the IP core where the master module is located; and sends the learning results to each slave module of the Ethernet switching chip. After receiving the learning result, each slave module may update, by using the learning result, the FDB of the IP core where the slave module is located. In this way, the synchronous update of the FDBs of the IP cores is implemented, and the consistency of the FDBs of the IP cores is maintained.

In practical applications, the user may set as needed, in system software of the switch, an information reporting function for each IP core. In this way, the master module may also send the message information learning result to the processor through the third processing module of the master IP core, so that the system software acquires the message information learning result from the processor and executes corresponding operations.

In practical applications, the information processing request received by the master IP core may be an information updating request sent by the processor.

Based on this, in an embodiment, in a case where the information processing request is an information updating request sent by the processor, the method may further include:

parsing the information updating request to obtain a parsing result;

in a case where the first judgment result indicates that the information updating request is associated with all IP cores of the Ethernet switching chip, determining, by the master IP core, the parsing result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information;

in a case where the first judgment result indicates that the information updating request is associated with the master IP core of the Ethernet switching chip, determining, by the master IP core, the parsing result to serve as the second information, and updating, by the master IP core, a dedicated information table of the master IP core according to the second information; and in a case where the first judgment result indicates that the information updating request is associated with a slave IP core of the Ethernet switching chip, determining, by the master IP core, the parsing result to serve as the third information, and sending, by the master IP core, the third information to the corresponding slave IP core, so that the corresponding slave IP core updates the dedicated information table of the corresponding slave IP core according to the third information.

In practical applications, the processor may specifically be a Central Processing Unit (CPU) of the switch that is provided with the Ethernet switching chip.

In practical applications, the user may update the message processing information table of each IP core by means of the system software of the switch, and the system software may specifically read, through the processor, the information updating request of the user from a first location in a memory of the switch, and send the information updating request to the master IP core; and the first location may be set by the user in the system software as needed, the first location is used for storing the information updating request of the user, and the information updating request at least contains content requested by the user for updating and a storage location of the content in the message processing information table. The third processing module of the master IP core receives the information updating request that is sent by the system software through the processor, and judges the IP core associated with the information updating request according to the first preset strategy, so as to obtain the first judgment result; and parses the information updating request to obtain the parsing result (that is, determines the content requested by the user for updating and the storage location of the content in the message processing information table). In a case where the first judgment result indicates that the information updating request is associated with all IP cores of the Ethernet switching chip, the third processing module of the master IP core may send the parsing result to the first processing module of the master IP core, so that the first processing module of the master IP core updates the global information table of the master IP core according to the parsing result, at the same time, the third processing module of the master IP core may send the parsing result to the master module, the master module sends the parsing result to each slave module, after receiving the parsing result, each slave module sends the parsing result to the third processing module of the IP core where the slave module is located, the third processing module sends the parsing result to the first processing module of the IP core where the third processing module is located, so that the first processing module updates, according to the parsing result, the global information table of the IP core where the first processing module is located. In a case where the first judgment result indicates that the information updating request is associated with the master IP core of the Ethernet switching chip, the third processing module of the master IP core may directly send the parsing result to the first processing module of the master IP core, so that the first processing module of the master IP core updates the dedicated information table of the master IP core according to the parsing result. When the first judgment result represents that the information updating request is associated with a slave IP core (which is referred to as a first target slave IP core in the subsequent descriptions) of the Ethernet switching chip, the third processing module of the master IP core may send the parsing result to the master module, the master module sends the parsing result to the slave module of the first target slave IP core, after receiving the parsing result, the slave module of the first target slave IP core sends the parsing result to the third processing module of the first target slave IP core, and the third processing module of the first target slave IP core sends the parsing result to the first processing module of the first target slave IP core, so that the first processing module of the first target slave IP core updates, according to the parsing result, the dedicated information table of the IP core where the first processing module is located. Of course, when the master IP core needs to send the parsing result to the corresponding slave IP core, the master IP core may directly send the information updating request to the corresponding slave IP core, and the corresponding slave IP core parses the information updating request to obtain the parsing result, and executes corresponding operations. That is, the information updating request may be determined to serve as the third information, so as to be sent to the corresponding slave IP core.

In practical applications, the information processing request received by the master IP core may be an information reading request sent by the processor.

Based on this, in an embodiment, in a case where the information processing request is an information reading request sent by the processor, the method may further include:

in a case where the first judgment result indicates that the information reading request is associated with all IP cores of the Ethernet switching chip, determining, by the master IP core based on the information reading request, information, which is acquired from the global information table of the master IP core and corresponds to the information reading request, to serve as the fourth information, and sending, by the master IP core, the fourth information to the processor;

in a case where the first judgment result indicates that the information reading request is associated with the master IP core of the Ethernet switching chip, determining, by the master IP core based on the information reading request, information, which is acquired from the dedicated information table of the master IP core and corresponds to the information reading request, to serve as the fourth information, and sending, by the master IP core, the fourth information to the processor; and in a case where the first judgment result indicates that the information reading request is associated with a slave IP core of the Ethernet switching chip, sending, by the master IP core, the information reading request to the corresponding slave IP core, so as to acquire fifth information that is returned by the corresponding slave IP core in response to the information reading request, and sending, by the master IP core, the fifth information to the processor.

Specifically, in practical applications, since the third processing module of the master IP core performs information interaction with the processor by means of the PCIe bus, the system software on the switch may access, through the processor, the Ethernet switching chip in a Direct Memory Access (DMA) manner, that is, the third processing module of the master IP core may receive the information reading request that is sent by the system software through the processor, and judges the IP core associated with the information reading request according to the first preset strategy, so as to obtain the first judgment result. In a case where the first judgment result indicates that the information reading request is associated with all IP cores of the Ethernet switching chip, the third processing module of the master IP core may directly read, from the global information of the master IP core, the fourth information corresponding to the information reading request, and send the fourth information to the processor, so that the processor writes the fourth information into a second location in the memory of the switch; and the second location may be set by the user in the system software as needed. In a case where the first judgment result indicates that the information reading request is associated with the master IP core of the Ethernet switching chip, the third processing module of the master IP core may also directly read, from the dedicated information table of the master IP core, the fourth information corresponding to the information reading request, and send the fourth information to the processor, so that the processor writes the fourth information into a third location in the memory of the switch; and the third location may be set by the user in the system software as needed. When the first judgment result represents that the information reading request is associated with a slave IP core (which is referred to as a second target slave IP core in the subsequent descriptions) of the Ethernet switching chip, the third processing module of the master IP core may send the information reading request to the master module, the master module sends the information reading request to the slave module of the second target slave IP core, after receiving the information reading request, the slave module of the second target slave IP core sends the information reading request to the third processing module of the second target slave IP core, the third processing module of the second target slave IP core may read, from the dedicated information table of the second target slave IP core, the fifth information corresponding to the information reading request, and send the fifth information to the slave module of the second target slave IP core, the slave module of the second target slave IP core sends the fifth information to the master module, the master module sends the fifth information to the third processing module of the master IP core, and the third processing module of the master IP core sends the fifth information to the processor, so that the processor writes the fifth information into a fourth location in the memory of the switch; and the fourth location may also be set by the user in the system software as needed.

In practical applications, the user may also set a second preset strategy in the system software as needed, and the second preset strategy is used for enabling the Ethernet switching chip to actively report a running state in a running process of the switch; and the running state may specifically be the running state of each IP core, for example, statistical information on the number of messages sent and received by ports of each IP core. For each IP core, the running state may be used as a dedicated information table of a corresponding IP core in the form of a state information table. In this way, without receiving the information reading request sent by the processor, the master IP core may actively send the state information table of the master IP core to the processor according to a period contained in the second preset strategy, and send, to the processor, the received state information table of the corresponding slave IP core sent by each slave IP core. Specifically, the third processing module of the master IP core may send the state information table of the master IP core to the processor, so that the processor writes the state information table of the master IP core into a fifth location in the memory of the switch. At the same time, the master module may also receive the state information table, which is sent by each slave module, of the slave IP core where the slave module is located; the state information table, which is sent by each slave module, of the slave IP core where the slave module is located is acquired by the corresponding slave module from the third processing module of the slave IP core, and is sent by the same; after receiving the state information table of a slave IP core (which is referred to as a third target slave IP core in the subsequent descriptions), the master module may send the state information table of the third target slave IP core to the third processing module of the master IP core, and the third processing module of the master IP core sends the state information table of the third target slave IP core to the processor, so that the processor writes the state information table of the third target slave IP core into a sixth location in the memory of the switch.

Here, it should be noted that the period based on which the master IP core reports the state information table of the master IP core and the period based on which each slave IP core reports the state information table the slave IP core may be the same or different, which may be specifically set by the user in the second preset strategy; and the fifth location and the sixth location may also be set by the user in the system software as needed.

In practical applications, when the master IP core updates a global information table of the master IP core according to the first information corresponding to the information processing request, and sends the first information to each slave IP core of the Ethernet switching chip, so that the slave IP core updates a global information table of the slave IP core according to the first information, considering a time delay required for information interaction, that is, in order to implement that all IP cores update their respective global information tables synchronously, the user may also set a third preset strategy in the system software as needed, and the third preset strategy is used for, when the Ethernet switching chip needs to synchronously update the global information tables of the IP cores, enabling the master IP core to start updating the global information table of the master IP core after a preset time delay.

Specifically, the third preset strategy is used for enabling the master module to start updating the global information table of the IP core of the master module according to the first information corresponding to the information processing request after the preset time delay; the preset time delay is a difference value between a first moment and a second moment; the first moment is a moment when the master module sends the first information to each slave IP core of the Ethernet switching chip; and the second moment is a moment when the slave module of each slave IP core receives the first information.

In practical applications, the user may configure a pipeline of a preset number of stages in each IP core, and the pipeline of the preset number of stages is configured to implement the preset time delay; specifically, when the IP core is configured to be the master IP core, and the master IP core needs to update a global information table of the master IP core according to the first information, the master module may update the global information table of the master IP core by means of the pipeline of the preset number of stages, that is, start updating the global information table of the master IP core after the preset time delay; and when the IP core is configured to be the slave IP core, and the slave IP core needs to receive the first information sent by the master IP core to update a global information table of the slave IP core, the slave module of the slave IP core may skip the pipeline of the preset number of stages configured by the IP core where the slave module is located, and directly update, according to the first information, the global information table of the slave IP core where the slave module is located. Here, the user may determine the size of the preset time delay based on chip design requirements, for example, the user may set the preset number of stages of the pipeline configured for each IP core to be 2, that is, each IP core is configured with a two-stage pipeline, then the preset time delay may be determined to be 2 clock periods, and the clock period is a clock period of a clock module of the Ethernet switching chip. That is, after the two clock periods, the master module starts updating the global information table of the master IP core according to the first information, and at the same time, the master module also requires two clock periods to send the first information to the slave module of each IP core, that is, the corresponding slave module receives the first information after two clock periods and directly starts updating the global information table of the slave IP core where the corresponding slave module is located. In this way, the IP cores may synchronously update their respective global information tables.

In practical applications, in order to optimize the message processing performance of the Ethernet switching chip, the Ethernet switching chip needs to complete the update of the message processing information table of each IP core within a reasonable time range, that is, a time length required by the corresponding slave module for receiving the information sent by the master module should be within a reasonable time range (for example, 20 clock periods); and the user may determine, based on the chip design requirements, the time length required by the corresponding slave module for receiving the information sent by the master module, and set the time length by controlling the length of a data transmission line between the module, or in other ways.

In practical applications, in the process of updating the message processing information table, the corresponding module may perform operations of adding, deleting and modifying on the message processing strategy in the message processing information table.

In practical applications, each IP core of the Ethernet switching chip needs to be provided with a communication interface between the IP cores, so that the master IP core and each slave IP core may perform information interaction by means of the communication interface.

Based on this, in an embodiment, the method may further include:

performing, by the master IP core, information interaction with each slave IP core via a first interface provided on the master IP core and a second interface provided on each slave IP core.

In practical applications, in order to ensure the working efficiency of the Ethernet switching chip, the user may set the number of information interactions supported by the first interface and the second interface within each clock period as needed. For example, within each clock period, the first interface may transmit, to the corresponding slave IP core, a copy of information sent by the master IP core, and receive a copy of information sent by the corresponding slave IP core; and within each clock period, the second interface may transmit, to the master IP core, a copy of information sent by the corresponding slave IP core, and receive a copy of information sent by the master IP core.

In practical applications, according to the size of the information that the master IP core and each slave IP core need to transmit during information interaction, the user may set a maximum data volume, which the first interface and the second interface allow to pass, to be nbit, wherein n is a positive integer.

In practical applications, in order to ensure the correct rate of message forwarding of the Ethernet switching chip, an Error Correcting Code (ECC) technology or other error correcting technologies may be used to make the information interaction between the first interface and the second interface be error-free communication.

In the information processing method provided by the embodiments of the present disclosure, the master IP core of the Ethernet switching chip receives the information processing request, and executes one of following operations based on the received information processing request: updating a global information table of the master IP core according to the first information corresponding to the information processing request, and sending the first information to each slave IP core of the Ethernet switching chip, so that the slave IP core updates a global information table of the slave IP core according to the first information; updating a dedicated information table of the master IP core according to the second information corresponding to the information processing request, or, sending, to the corresponding slave IP core, the third information corresponding to the information processing request, so that the corresponding slave IP core updates a dedicated information table of the corresponding slave IP core according to the third information; and acquiring, based on the information processing request and from the global information table or the dedicated information table of the master IP core, the fourth information corresponding to the information processing request and sending the fourth information to the processor, or, sending the information processing request to the corresponding slave IP core, so as to receive the fifth information that is returned by the corresponding slave IP core in response to the information processing request, and sending the fifth information to the processor, wherein the master IP core is an IP core in the at least two IP cores contained in the Ethernet switching chip; the slave IP core is an IP core in the at least two IP cores except the master IP core; the information processing request received by the master IP core is from the processor, or is from the slave IP core of the Ethernet switching chip; the processor is a processor of the switch that is provided with the Ethernet switching chip; the global information table is used for storing the information associated with all IP cores of the Ethernet switching chip; the dedicated information table is used for storing the information associated with one IP core of the Ethernet switching chip; and the fifth information is information, which corresponds to the information processing request, in the dedicated information table of the corresponding slave IP core. In this way, the operations of the IP cores in the dual-core or multi-core Ethernet switching chip generate no conflict, which further enables external system behaviors of the dual-core or multi-core Ethernet switching chip to be the same as those of the single-core Ethernet switching chip.

The present disclosure will be described in further detail below in conjunction with an application embodiment.

Figure 3:
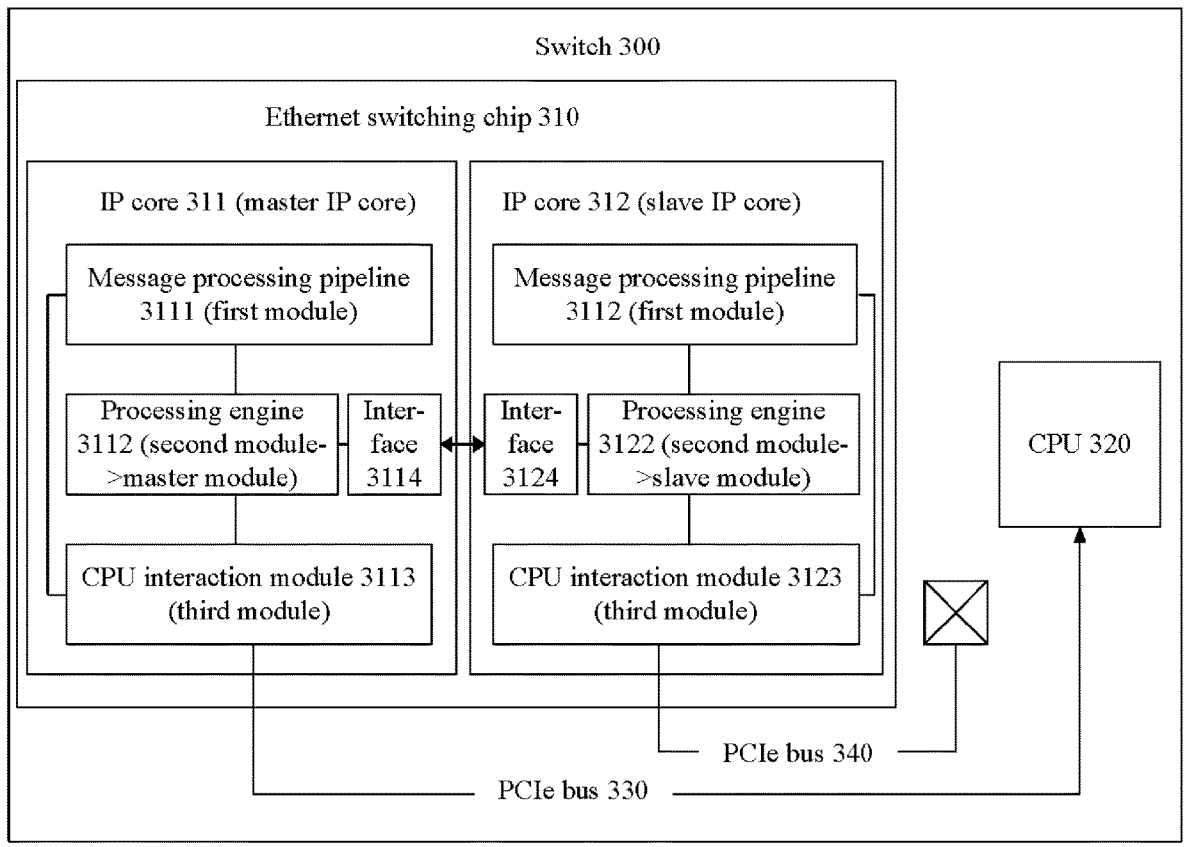
FIG. 3 is a schematic structural diagram of a switch according to an application embodiment of the present disclosure.

In the present application embodiment, as shown in FIG. 3, a switch 300 includes a dual-core Ethernet switching chip 310 and a CPU 320; the Ethernet switching chip 310 includes an IP core 311 and an IP core 312; each IP core includes a message processing pipeline (i.e., the above first processing module, which may be referred to as a first module), a processing engine (i.e., the above second processing module, which may be referred to as a second module), and a CPU interaction module (i.e., the above third processing module, which may be referred to as a third module) and an interface (i.e., the above first interface or second interface); that is, the IP core 311 includes a first module 3111, a second module 3112, a third module 3113 and an interface 3114; and the IP core 312 includes a first module 3121, a second module 3122, a third module 3123 and an interface 3124;

the first module 3111 and the first module 3121 are configured to perform corresponding processing on received messages according to message processing information tables of the IP cores where the first module 3111 and the first module 3121 are located;

the second module 3112 and the second module 3122 are configured to update the message processing information tables of the IP cores where the second module 3112 and the second module 3122 are located; the update includes adding a message processing strategy, modifying the message processing strategy and deleting the message processing strategy (in practical applications, the corresponding message processing information table may also be updated by the first module 3111 or the first module 3121);

the third module 3113 and the third module 3123 are configured to perform information interaction with the CPU 320 by means of a PCIe bus 330 or a PCIe bus 340; and the interface 3114 and the interface 3124 are configured to implement the information interaction between the second modules, that is, implement the information interaction between the IP cores.

In the present application embodiment, the second module 3112 is a master module, and the second module 3122 is a slave module; correspondingly, the IP core 311 is a master IP core, and the IP core 312 is a slave IP core; the IP core 311 performs information interaction with the CPU 320 by means of the PCIe bus 330, and the PCIe bus 340 connected to the IP core 312 is not connected to the CPU 320; and when the master module and the slave module need to be switched, that is, when the second module 3122 is configured to be the master module and the second module 3112 is configured to be the slave module, the connection between the PCIe bus 330 and the CPU 320 needs to be disconnected, and the PCIe bus 340 is connected to the CPU 320, so that the IP core 312 may act as the master IP core to perform information interaction with the CPU 320.

Herein, there is no substantial difference between "the IP core 311 performs information interaction with the CPU 320 by means of the PCIe bus 330, and the PCIe bus 340 connected to the IP core 312 is not connected to the CPU 320 (that is, the second module 3112 is the master module, the second module 3122 is the slave module, the IP core 311 is the master IP core, and the IP core 312 is the slave IP core)" and "the IP core 312 performs information interaction with the CPU 320 by means of the PCIe bus 340, and the PCIe bus 330 connected to the IP core 311 is not connected to the CPU 320 (that is, the second module 3122 is the master module, the second module 3112 is the slave module, the IP core 312 is the master IP core, and the IP core 311 is the slave IP core)". It is taken as an example for illustration in the present application embodiment that, "the IP core 311 performs information interaction with the CPU 320 by means of the PCIe bus 330, and the PCIe bus 340 connected to the IP core 312 is not connected to the CPU 320 (that is, the second module 3112 is the master module, the second module 3122 is the slave module, the IP core 311 is the master IP core, and the IP core 312 is the slave IP core)".

Based on the Ethernet switching chip 310, the information processing method in the present application embodiment may include three table entry maintenance conditions: internal table entry maintenance of the master IP core 311 (that is, the master IP core 311 updates a dedicated information table of the master IP core 311); internal table entry maintenance of the IP core 312 (that is, the slave IP core 312 updates a dedicated information table of the slave IP core 312), and synchronous table entry maintenance of the master IP core 311 and the slave IP core 312 (that is, the master IP core 311 and the slave IP core 312 simultaneously update their respective global information tables based on the same information).

In practical applications, the internal table entry maintenance of the IP core may be the maintenance of the message processing information table (i.e., the above dedicated information table) that is strongly related to the interface, such as the interface attribute information table, the index ID contained in the interface attribute information table is the interface ID, and a specified interface should belong to a fixed IP core; the synchronous table entry maintenance of the master IP core and the slave IP core may be the maintenance of the message processing information table (i.e., the above global information table) that is weakly related to the interface, such as FDB, an RIB, an MPLS, an ILM and other message forwarding information tables, and as another example, public resource information tables such as a time synchronization counter information table and a bandwidth evaluation information table, and state message processing information tables such as AST corresponding to the FDB; and in order to make the Ethernet switching chip 310 query the same message processing information table no matter receiving the message from which interface, the message processing information tables, which need to be maintained synchronously, need to be globally consistent, that is, the message processing information table, which needs to be maintained synchronously and is stored in the master IP core, need to be maintained consistent with the message processing information table, which needs to be maintained synchronously and is stored in the slave IP core.

In practical applications, the above three table entry maintenance conditions may be implemented by a master module working mechanism and a slave module working mechanism.

Specifically, the master module working mechanism includes: the master module 3112 receives the information processing request from the first module 3111 or the information processing request sent by the CPU 320 by means of the third module 3113, and performs corresponding information processing to obtain a processing result; and writes the processing result back into the first module 3111 (i.e., updates the message processing information table of the master IP core 311 by means of the first module 3111); and/or, informs the slave module 3122 of the processing result by means of the interface 3114 and the interface 3124, and the slave module 3122 writes the processing result into the first module 3121 (i.e., updates the message processing information table of the slave IP core 312 by means of the first module 3121); and/or, reports the processing result to the CPU 320 by means of the third module 3113 and the PCIe bus 330.

Correspondingly, the slave module working mechanism includes: the slave module 3122 receives the information processing request of the first module 3121, and sends the information processing request to the master module 3112 by means of the interface 3124 and the interface 3114; the master module 3112 receives the information processing request, performs corresponding information processing to obtain a processing result; the master module 3112 writes the processing result into the first module 3111 (i.e., updates the message processing information table of the master IP core 311 by means of the first module 3111), and meanwhile informs the slave module 3122 of the processing result by means of the interface 3114 and the interface 3124, the slave module 3122 writes the processing result back into the first module 3121 (i.e., updates the message processing information table of the slave IP core 312 by means of the first module 3121); and/or, reports the processing result to the CPU 320 by means of the third module 3113 and the PCIe bus 330.

In practical applications, the master module working mechanism and the slave module working mechanism may specifically be embodied in the following three application scenarios:

First application scenario: for the forwarding of the Ethernet layer-2 message, assuming that the Ethernet switching chip 310 is a single-core Ethernet switching chip and only contains the IP core 311, then, after receiving the message, the first module 3111 of the IP core 311 queries the FDB stored in the IP core 311 by means of the receiving direction interface attribute and the destination address information carried in the received message, so as to forward the received message; however, if corresponding information is not found in the FDB, the first module 3111 needs to send an FDB learning request to the second module 3112, a learning sub-module in the first module 3111 receives the FDB learning request, and performs a corresponding FDB table entry learning operation to obtain a learning result; the learning result includes: forwarding address information, a destination outbound interface attribute and location information that the learning result should be stored in the FDB; the second module 3112 returns the obtained learning result to first module 3111, the first module adds combined information (i.e., the forwarding address information and the destination outbound interface attribute) in the learning result into the storage location in the FDB, which is contained in the learning result, so as to complete the update of the FDB; and the updated FDB is used for performing forwarding processing on the received message when the first module 3111 receives the message.

Since the Ethernet switching chip 310 only contains the IP core 311, the process of the second module 3112 for returning the learning result to the first module 3111 is very simple; however, the Ethernet switching chip 310 is actually a dual-core Ethernet switching chip, which contains the IP Core 311 and the IP core 312; and since each IP core has a second module, and the FDB is a message processing information table that requires global maintenance, if the first module 3111 triggers the table entry learning operation of the second module 3112 to obtain the learning result, the second module 3112 returns the learning result to the first module 3111, and meanwhile sends the learning result of the second module 3122, the second module 3122 sends the learning result to the first module 3121, so that the first module 3121 may update, synchronously with the first module 3111, the FDB of the IP core where the first module 3121 is located; at this time, if the second module 3122 is also processing the FDB learning request sent by the first module 3121 and obtains another learning result, when the second module 3122 returns the other learning result to the first module 3121, this learning result may be conflicting with the learning result sent by the core 311; and especially when the FDB is stored in the Hash manner, there may be a conflict between the writing locations of the two learning results. Therefore, in order to avoid such a problem, the FDB of the master IP core 311 and the FDB of the slave IP core 312 should be updated by using the master module working mechanism and the slave module working mechanism.

Under the master module working mechanism, the first module 3111 of the master IP core 311 triggers the FDB table entry learning operation of the master module 3112, the master module 3112 completes the FDB table entry learning operation to obtain the learning result, returns the learning result to the first module 3111, and meanwhile sends the learning result to the slave module 3122, and the slave module 3122 sends the learning result to the first module 3121.

Under the slave module working mechanism, the first module 3121 of the slave IP core 312 sends the FDB learning request to the slave module 3122, the slave module 3122 sends the received FDB learning request to the master module 3112, and the master module 3112 completes the corresponding FDB table entry learning operation to obtain the learning result; and the master module 3112 sends the learning result to the first module 3111, and meanwhile sends the learning result to the slave module 3122, and the slave module 3122 returns the learning result to the first module 3121.

Second application scenario: in a running process of the switch 300, the system software on the switch 300 will provide the user with the running state of the switch 300, the running state of the switch 300 at least contains the running state of the Ethernet switching chip 310, the running state of the Ethernet switching chip 310 needs to be actively provided by the Ethernet switching chip 310 for the system software, and the system software summarizes the running state of the Ethernet switching chip 310 and displays the same for the user; and the running state of the Ethernet switching chip 310 includes the running state of each IP core, for example, statistical information on the number of messages sent and received by the port, etc. The periods and times of the master IP core 311 and the slave IP core 312 for providing the running state may be the same or different, and the user may perform autonomous setting as needed. The master IP core 311 and the slave IP core 312 send corresponding running state information (i.e., the above state information tables) from the respective first modules to the respective third modules. However, since the third module 3113 of the master IP core 311 may perform information interaction with the CPU 320, but the third module 3123 of the slave IP core cannot perform information interaction with the CPU 320, the third module 3113 may directly send the running state information in the first module 3111 to the CPU 320 by means of the PCIe bus 330, so that the CPU 320 writes the running state information of the master IP core into a location, which is specified by the system software, in the system memory (i.e., the memory of the switch 300); and the third module 3123 needs to send the running state information of the slave IP core to the slave module 3122, the slave module 3122 sends the running state information of the slave IP core to the master module 3112 by means of the interface 3124 and the interface 3114, the master module 3112 sends the running state information of the slave IP core to the third module 3112, and the third module 3112 sends the running state information of the slave IP core to the CPU 320 by means of the PCIe bus 330, so that the CPU 320 writes the running state information of the slave IP core into a location specified by the system software in the system memory.

Third application scenario: the CPU 320 establishes a connection with the Ethernet switching chip 310 by means of the PCIe bus, so that the system software may access the Ethernet switching chip 310 in a DMA manner. The third module 3113 of the master IP core 311 is responsible for receiving a DMA request sent by the system software by means of the CPU 320, and the DMA request at least includes a reading request and a writing request.

When the DMA request is a reading request, if the reading request is directed to the message processing information table which is synchronously maintained by the master IP core 311 and the slave IP core 312, or the reading request is directed to the message processing information table which is maintained in the master IP core 311, the third module 3113 only needs to read corresponding information from the message processing information table of the master IP core 311 by means of the first module 3111, and send the read information to the CPU 320, so that the CPU 320 writes the read information into a location specified by the system software in the system memory. If the reading request is directed to the message processing information table which is maintained in the slave IP core 312, the third module 3113 needs to send the reading request to the master module 3112, the master module 3112 sends the reading request to the slave module 3122, the slave module 3122 sends the reading request to the third module 3123, the third module 3123 processes the reading request, the first module 3121 reads corresponding information from the message processing information table of the slave IP core 312, and sends the read result information to the slave module 3122, the slave module 3122 sends the result information to the master module 3112, the master module 3112 returns the result information to the third module 3113, and the third module 3113 sends the result information to the CPU 320, so that the CPU 320 writes the result information into a location specified by the system software in the system memory.

When the DMA request is a writing request, if the writing request is directed to the message processing information table which is synchronously maintained by the master IP core 311 and the slave IP core 312, it is necessary to synchronously write, into the first module 3111 and the first module 3121, information corresponding to the writing request. Specifically, the third module 3113 obtains to-be-written data from a location specified by the system software in the system memory (herein, the to-be-written data may be regarded as the writing request, and the writing request contains data input by the user through the system software). Firstly, the third module 3113 sends the to-be-written data to the master module 3112, and meanwhile sends the to-be-written data into a pipeline of a specified number of stages, and the outlet of the pipeline is the first module 3111; and the master module 3112 sends the to-be-written data to the slave module 3122 by means of the interface 3114 and the interface 3124, the slave module 3122 sends the to-be-written data to the third module 3123, the third module 3123 skips the pipeline of the specified number of stages which is configured in the slave IP core, and directly sends the to-be-written data to the first module 3121, so as to directly update the message processing information table of the IP core 312. Herein, assuming that the moment when the master module 3112 sends the to-be-written data to the interface 3114 is a first moment, the moment when the first module 3121 receives the to-be-written data is a second moment, and the time difference between the second moment and the first moment is X clock periods of the Ethernet switching chips 310, then it may be determined that the number of stages of the pipeline of the specified number of stages in the master IP core is X. In this way, the master IP core 311 and the slave IP core 312 may implement synchronous maintenance of the message processing information table. If the writing request is directed to the message processing information table which is maintained in the master IP core 311, after acquiring the to-be-written data from the location specified by the system software in the system memory, the third module 3113 may skip the pipeline of the specified number of stages which is configured in the slave IP core, and directly send the to-be-written data to the first module 3111, so that the first module 3111 directly updates the message processing information table which is maintained in the corresponding master IP core 311. If the writing request is directed to the message processing information table which is maintained in the slave IP core 312, after acquiring the to-be-written data from the location specified by the system software in the system memory, the third module 3113 sends the to-be-written data to the master module 3112, the master module sends the to-be-written data to the slave module 3122 by means of the interface 3114 and the interface 3124, the slave module 3122 sends the to-be-written data to the third module 3123, and the third module 3123 skips the pipeline of the specified number of stages which is configured in the slave IP core, and directly sends the to-be-written data to the first module 3121, so that the first module 3121 updates the message processing information table which is maintained in the corresponding slave IP core 312.

Herein, the specific implementation process of the information processing method provided by the present application embodiment is the same as the specific implementation process of the operations 201 to 202 in the information processing method shown in FIG. 2, and thus will not be repeated herein.

The Ethernet switching chip 310 and the information processing method provided by the present application embodiment have the following advantages:

The problem of basic inter-operation conflicts of the various IP cores in the dual-core or multi-core Ethernet switching chip is solved, so that the external system behaviors of dual-core or multi-core Ethernet switching chips are the same as those of the single-core Ethernet switching chip.

Figure 4:
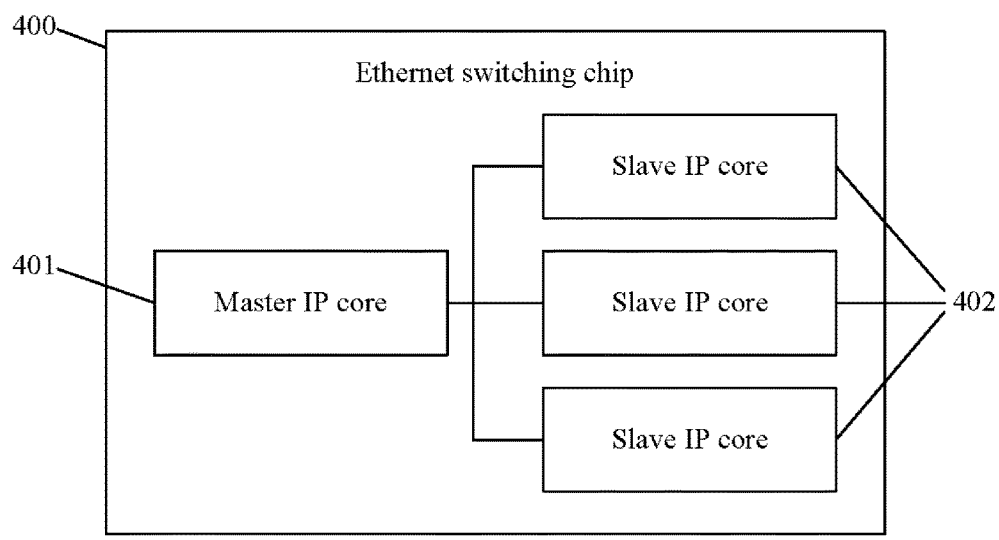
FIG. 4 is a schematic structural diagram of an Ethernet switching chip according to an embodiment of the present disclosure.

In order to implement the method in the embodiments of the present disclosure, the embodiments of the present disclosure further provide an Ethernet switching chip. As shown in FIG. 4, an Ethernet switching chip 400 contains at least two IP cores; one IP core in the at least two IP cores is a master IP core 401; one or more IP cores in the at least two IP cores except the master IP core are slave IP cores 402; wherein the master IP core 401 is configured to:
receive an information processing request;
execute one of following operations based on the received information processing request:
updating a global information table of the master IP core 401 according to first information corresponding to the information processing request, and sending the first information to each slave IP core 402 of the Ethernet switching chip, so that the slave IP core 402 updates a global information table of the slave IP core 402 according to the first information, wherein the received information processing request is from a processor of a switch that is provided with the Ethernet switching chip, and the slave IP core 402 of the Ethernet switching chip;
updating a dedicated information table of the master IP core 401 according to second information corresponding to the information processing request, or, sending, to a corresponding slave IP core 402, third information corresponding to the information processing request, so that the corresponding slave IP core 402 updates a dedicated information table of the slave IP core 402 according to the third information, wherein the received information processing request is from the processor or the slave IP core 402 of the Ethernet switching chip; and
acquiring, based on the information processing request and from the global information table or the dedicated information table of the master IP core, fourth information corresponding to the information processing request and sending the fourth information to the processor, or, acquiring fifth information from a corresponding slave IP core 402 and sending the fifth information to the processor, wherein the fifth information is information, which corresponds to the information processing request, in the dedicated information table of the corresponding slave IP core 402;
the global information table is used for storing information associated with all IP cores of the Ethernet switching chip; and the dedicated information table is used for storing information associated with one IP core of the Ethernet switching chip.

In an embodiment, the master IP core 401 is configured to:
judge, according to a first preset strategy, an IP core associated with the information processing request, so as to obtain a first judgment result; and
execute a corresponding operation according to the first judgment result and based on the received information processing request.

In an embodiment, the information processing request is a message information learning request sent by a slave IP core 402, and the master IP core 401 is configured to:
in response to the received message information learning request, execute a self-learning operation corresponding to the message information learning request, so as to obtain a message information learning result;
in a case where the first judgment result indicates that the message information learning request is associated with all IP cores of the Ethernet switching chip, determine the message information learning result to serve as the first information, update the global information table of the master IP core 401 according to the first information, and send the first information to each slave IP core 402 of the Ethernet switching chip, so that the slave IP core 402 updates the global information table of the slave IP core 402 according to the first information; and
when the first judgment result represents that the message information learning request is associated with a slave IP core 402 of the Ethernet switching chip, determine the message information learning result to serve as the second information, and send the second information to the corresponding slave IP core 402, so that the corresponding slave IP core 402 updates the dedicated information table of the corresponding slave IP core 402 according to the second information.

In an embodiment, when one of the following conditions is met, the slave IP core 402 sends the message information learning request to the master IP core 401:
the slave IP core 402 does not find, from the global information table or the dedicated information table of the slave IP core, a message processing strategy corresponding to a received message; or
the slave IP core 402 fails to perform corresponding processing on the received message according to the message processing strategy, which corresponds to the received message and is found from the global information table or the dedicated information table of the slave IP core.

In an embodiment, the information processing request is an information updating request sent by the processor, and the master IP core 401 is configured to:
parse the information updating request to obtain a parsing result;
in a case where the first judgment result indicates that the information updating request is associated with all IP cores of the Ethernet switching chip, determine the parsing result to serve as the first information, update the global information table of the master IP core 401 according to the first information, and send the first information to each slave IP core 402 of the Ethernet switching chip, so that the slave IP core 402 updates the global information table of the slave IP core 402 according to the first information;

when the first judgment result represents that the information updating request is associated with the master IP core 401 of the Ethernet switching chip, determine the parsing result to serve as the second information, and update a dedicated information table of the master IP core 401 according to the second information; and when the first judgment result represents that the information updating request is associated with a slave IP core 402 of the Ethernet switching chip, determine the parsing result to serve as the third information, and send the third information to the corresponding slave IP core 402, so that the corresponding slave IP core 402 updates the dedicated information table of the corresponding slave IP core 402 according to the third information.

In an embodiment, the information processing request is an information reading request sent by the processor, and the master IP core 401 is configured to:

in a case where the first judgment result indicates that the information reading request is associated with all IP cores of the Ethernet switching chip, based on the information reading request, determine, information, which is acquired from the global information table of the master IP core and corresponds to the information reading request, to serve as the fourth information, and send the fourth information to the processor;

when the first judgment result represents that the information reading request is associated with the master IP core 401 of the Ethernet switching chip, based on the information reading request, determine, information, which is acquired from the dedicated information table of the master IP core and corresponds to the information reading request, to serve as the fourth information, and send the fourth information to the processor; and when the first judgment result represents that the information reading request is associated with a slave IP core 402 of the Ethernet switching chip, send the information reading request to the corresponding slave IP core 402, so as to acquire fifth information that is returned by the corresponding slave IP core 402 in response to the information reading request, and send the fifth information to the processor.

In an embodiment, the master IP core 401 is configured to:

perform information interaction with each slave IP core 402 via a first interface provided on the master IP core and a second interface provided on each slave IP core 402.

In practical applications, the master IP core 401 and the slave IP core 402 may be implemented by the processor in the Ethernet switching chip 400.

It should be noted that, various modules in the Ethernet switching chip 400 provided by the above embodiments are only illustrated by the division of the above program modules. In practical applications, the above processing may be allocated to different program modules for completion as needed, that is, an internal structure of an apparatus is divided into different program modules to complete all or part of the above processing. In addition, the Ethernet switching chip 400 provided by the above embodiments belongs to the same concept as the method embodiments. The specific implementation process thereof is detailed in the method embodiments, and thus will not be repeated herein.

Figure 5:
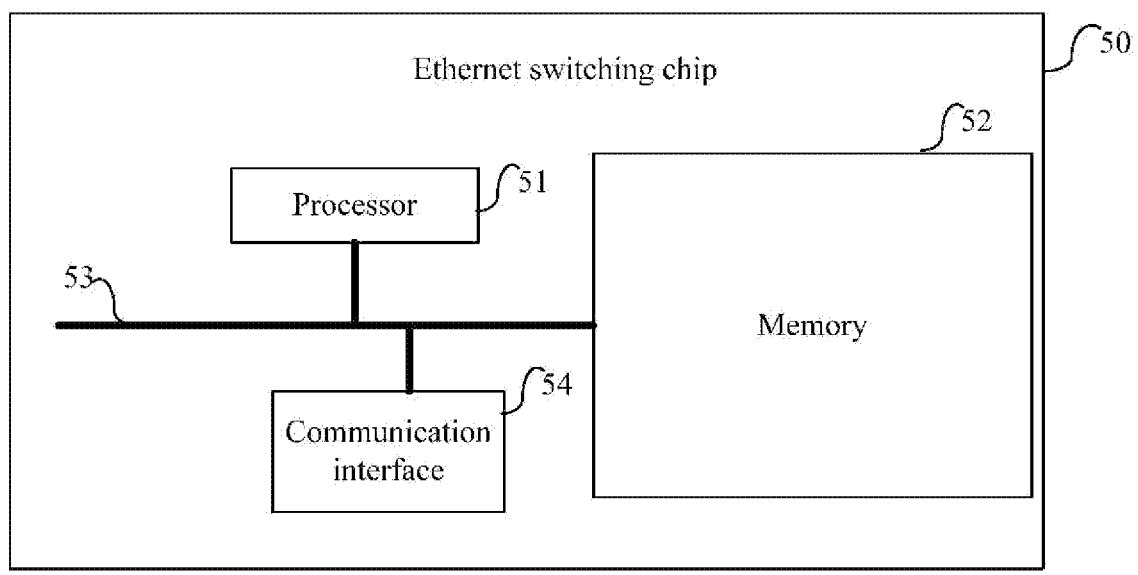
FIG. 5 is a schematic diagram of a hardware structure of an Ethernet switching chip according to an embodiment of the present disclosure.

Based on the hardware implementation of the above program modules, and in order to implement the method of the embodiments of the present disclosure, the embodiments of the present disclosure further provide an Ethernet switching chip. As shown in FIG. 5, an Ethernet switching chip 50 includes a memory 52, a processor 51, and a computer program, which is stored on the memory 52 and executable on the processor 51; and when executing the program, the processor 51 implements the method provided by one or more technical solutions described above.

Specifically, the master IP core of the Ethernet switching chip 50 executes following operations through the processor 51:

receiving an information processing request; executing one of following operations based on the received information processing request: updating a global information table of the master IP core according to first information corresponding to the information processing request, and sending the first information to each slave IP core of the Ethernet switching chip, so that the slave IP core updates a global information table of the slave IP core according to first information; updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information; and acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the master IP core is an IP core in at least two IP cores contained in the Ethernet switching chip; the slave IP core is an IP core in the at least two IP cores except the master IP core; the information processing request received by the master IP core is from the processor, or is from the slave IP core of the Ethernet switching chip; the processor is a processor of a switch that is provided with the Ethernet switching chip, the global information table is used for storing the information associated with all IP cores of the Ethernet switching chip; the dedicated information table is used for storing the information associated with one IP core of the Ethernet switching chip; and the fifth information is information, which corresponds to the information processing request, in the dedicated information table of the corresponding slave IP core.

It should be noted that, for the specific process of the processor 51 for executing the operations, reference may be made to the method embodiments, which will not be repeated herein.

Of course, in practical applications, various components in the Ethernet switching chip 50 are coupled together by a bus system 53. It can be understood that, the bus system 53 is configured to implement connection communication between these components. In addition to a data bus, the bus system 53 further includes a power bus, a control bus and a state signal bus. But for the sake of clarity, in FIG. 5, various buses are marked as bus systems 53; and meanwhile, the Ethernet switching chip 50 may further include a communication interface 54, which is configured to perform information interaction with other devices.

The memory 52 in the embodiments of the present disclosure is configured to store various types of data, so as to support the operations of the Ethernet switching chip 50. Examples of these data include: any computer program for operating on the Ethernet switching chip 50.

The method disclosed in the above embodiments of the present disclosure may be applied to the processor 51, or implemented by the processor 51. The processor 51 may be an integrated circuit chip with signal processing capability. In an implementation process, each operation of the above method may be completed by a hardware integrated logic circuit or instructions in the form of software in the processor 51. The above processor 51 may be a general-purpose processor, a Digital Signal Processor (DSP), or other programmable logic devices, discrete gates or transistor logic devices, discrete hardware components, and the like. The processor 51 may implement or execute the methods, operations and logical block diagrams disclosed in the embodiments of the present disclosure. The general-purpose processor may be a microprocessor or any conventional processor, or the like. In conjunction with the operations of the method disclosed in the embodiments of the present disclosure, it may be directly embodied as being executed by a hardware decoding processor, or by a combination of hardware and software modules in the decoding processor. The software module may be located in a storage medium, the storage medium is located in the memory 52, and the processor 51 reads information in the memory 52, and completes the operations of the foregoing method in combination with hardware.

In an exemplary embodiment, the Ethernet switching chip 50 may be implemented by one or more Application Specific Integrated Circuits (ASIC), a DSP, a Programmable Logic Device (PLD), a Complex Programmable Logic Device (CPLD), a Field-Programmable Gate Array (FPGA), a general-purpose processor, a controller, a Micro Controller Unit (MCU), a Microprocessor, or other electronic components, and is configured to execute the foregoing method.

It can be understood that, the memory (the memory 52) in the embodiments of the present disclosure may be a volatile memory or a non-volatile memory, and may also include both the volatile memory and the non-volatile memory, wherein the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, a compact disc, or a Compact Disc Read-Only Memory (CD-ROM); and the magnetic surface memory may be a disk memory or a magnetic tape memory. The volatile memory may be a Random Access Memory (RAM), which is used as an external cache. By way of exemplary, but not restrictive illustrations, many forms of RAMS are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memories described in the embodiments of the present disclosure are intended to include, but are not limited to, these and any other suitable types of memories.

In an exemplary embodiment, the embodiments of the present disclosure further provide a storage medium, that is, a computer storage medium, which is specifically a computer-readable storage medium, for example, including the memory 52 for storing a computer program, and the above computer program may be executed by the processor 51 of the Ethernet switching chip 50, so as to complete the operations described in the foregoing method. The computer-readable storage medium may be memories such as an FRAM, an ROM, a PROM, an EPROM, an EEPROM, a Flash Memory, a magnetic surface memory, an optical disk, or a CD-ROM.

It should be noted that "first", "second" and the like are used for distinguishing similar objects, but are not necessarily used for describing a specific sequence or order.

In addition, the technical solutions described in the embodiments of the present disclosure may be arbitrarily combined with each other, if there is no conflict.

The above descriptions are only preferred embodiments of the present disclosure, and are not intended to limit the protection scope of the present disclosure.

What is claimed is:

1. An information processing method, comprising:
receiving, by a master Intellectual Property (IP) core of an Ethernet switching chip, an information processing request, wherein the master IP core is an IP core in at least two IP cores contained in the Ethernet switching chip; and
executing, by the master IP core, one of following operations based on the received information processing request:
updating a global information table of the master IP core according to first information corresponding to the information processing request, and sending the first information to each slave IP core of the Ethernet switching chip, so that the slave IP core updates a global information table of the slave IP core according to the first information, wherein the received information processing request is from a processor of a switch that is provided with the Ethernet switching chip, or is from a slave IP core of the Ethernet switching chip;
updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information, wherein the received information processing request is from the processor, or is from the slave IP core of the Ethernet switching chip; or
acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the fifth information is information, which corresponds to the information processing request, in the dedicated information table of the corresponding slave IP core;

wherein the slave IP core is an IP core in the at least two IP cores except the master IP core; the global information table is used for storing information associated with all IP cores of the Ethernet switching chip; and the dedicated information table is used for storing information associated with one IP core of the Ethernet switching chip.

2. The method according to claim 1, wherein the method further comprises:
   judging, by the master IP core, an IP core associated with the information processing request according to a first preset strategy, so as to obtain a first judgment result; and
   executing a corresponding operation according to the first judgment result and based on the received information processing request.

3. The method according to claim 2, wherein the information processing request is a message information learning request sent by a slave IP core; the method further comprises:
   executing, by the master IP core in response to the received message information learning request, a self-learning operation corresponding to the message information learning request, so as to obtain a message information learning result;
   in a case where the first judgment result indicates that the message information learning request is associated with all IP cores of the Ethernet switching chip, determining, by the master IP core, the message information learning result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information; and
   in a case where the first judgment result indicates that the message information learning request is associated with a slave IP core of the Ethernet switching chip, determining, by the master IP core, the message information learning result to serve as the second information, and sending, by the master IP core, the second information to the corresponding slave IP core, so that the corresponding slave IP core updates the dedicated information table of the corresponding slave IP core according to the second information.

4. The method according to claim 3, wherein the slave IP core sends the message information learning request to the master IP core in a case where one of following conditions is met:
   the slave IP core does not find, from the global information table or the dedicated information table of the slave IP core, a message processing strategy corresponding to a received message; or
   the slave IP core fails to perform corresponding processing on the received message according to the message processing strategy, which corresponds to the received message and is found from the global information table or the dedicated information table of the slave IP core.

5. The method according to claim 2, wherein the information processing request is an information updating request sent by the processor; the method further comprises:
   parsing the information updating request to obtain a parsing result;
   in a case where the first judgment result indicates that the information updating request is associated with all IP cores of the Ethernet switching chip, determining, by the master IP core, the parsing result to serve as the first information, updating, by the master IP core, the global information table of the master IP core according to the first information, and sending, by the master IP core, the first information to each slave IP core of the Ethernet switching chip, so that the slave IP core updates the global information table of the slave IP core according to the first information;
   in a case where the first judgment result indicates that the information updating request is associated with the master IP core of the Ethernet switching chip, determining, by the master IP core, the parsing result to serve as the second information, and updating, by the master IP core, the dedicated information table of the master IP core according to the second information; and
   in a case where the first judgment result indicates that the information updating request is associated with a slave IP core of the Ethernet switching chip, determining, by the master IP core, the parsing result to serve as the third information, and sending, by the master IP core, the third information to the corresponding slave IP core, so that the corresponding slave IP core updates the dedicated information table of the corresponding slave IP core according to the third information.

6. The method according to claim 2, wherein the information processing request is an information reading request sent by the processor; the method further comprises:
   in a case where the first judgment result indicates that the information reading request is associated with all IP cores of the Ethernet switching chip, determining, by the master IP core based on the information reading request, information, which is acquired from the global information table of the master IP core and corresponds to the information reading request, to serve as the fourth information, and sending, by the master IP core, the fourth information to the processor;
   in a case where the first judgment result indicates that the information reading request is associated with the master IP core of the Ethernet switching chip, determining, by the master IP core based on the information reading request, information, which is acquired from the dedicated information table of the master IP core and corresponds to the information reading request, to serve as the fourth information, and sending, by the master IP core, the fourth information to the processor; and
   in a case where the first judgment result indicates that the information reading request is associated with a slave IP core of the Ethernet switching chip, sending, by the master IP core, the information reading request to the corresponding slave IP core, so as to acquire fifth information that is returned by the corresponding slave IP core in response to the information reading request, and sending, by the master IP core, the fifth information to the processor.

7. The method according to claim 1, wherein the method further comprises:
   performing, by the master IP core, information interaction with each slave IP core via a first interface provided on the master IP core and a second interface provided on each slave IP core.

8. An Ethernet switching chip, comprising at least two IP cores; one IP core in the at least two IP cores is a master IP core; one or more IP cores in the at least two IP cores except the master IP core are slave IP cores; wherein
   the master IP core is configured to:
   receive an information processing request;

execute one of following operations based on the received information processing request:

updating a global information table of the master IP core according to first information corresponding to the information processing request, and sending the first information to each slave IP core of the Ethernet switching chip, so that the slave IP core updates a global information table of the slave IP core according to the first information, wherein the received information processing request is from a processor of a switch that is provided with the Ethernet switching chip, or is from a slave IP core of the Ethernet switching chip;

updating a dedicated information table of the master IP core according to second information corresponding to the information processing request, or, sending, to a corresponding slave IP core, third information corresponding to the information processing request, so that the corresponding slave IP core updates a dedicated information table of the corresponding slave IP core according to the third information, wherein the received information processing request is from the processor, or is from the slave IP core of the Ethernet switching chip; or acquiring, based on the information processing request and from the global information table or the dedicated information table of the master IP core, fourth information corresponding to the information processing request and sending the fourth information to the processor, or, acquiring fifth information from a corresponding slave IP core and sending the fifth information to the processor, wherein the fifth information is information, which corresponds to the information processing request, in the dedicated information table of the corresponding slave IP core;

wherein the global information table is used for storing information associated with all IP cores of the Ethernet switching chip; and the dedicated information table is used for storing information associated with one IP core of the Ethernet switching chip.

9. An Ethernet switching chip, comprising: a processor, and a memory configured to store a computer program executable on the processor;

wherein the processor is configured to execute the operations of the method according to claim 1 when running the computer program.

10. A non-transitory computer-readable storage medium, wherein a computer program is stored in the non-transitory computer-readable storage medium, and when executed by a processor, the computer program implements the operations of the method according to claim 1.

11. The method according to claim 1, wherein before receiving, by the master IP core of the Ethernet switching chip, the information processing request, the method further comprises:

configuring an IP core of the Ethernet switching chip to serve as the master IP core, and configuring one or more other IP cores of the Ethernet switching chip except the master IP core to serve as the slave IP cores.

12. The method according to claim 11, wherein judging, by the master IP core, the IP core associated with the information processing request according to a first preset strategy comprises:

judging, by the master IP core, the IP core associated with the information processing request according to an IP core identifier and a message processing information table identifier contained in the information processing request.

13. The method according to claim 3, wherein the self-learning operation corresponding to the message information learning request is a self-learning operation of information including at least one of: a source IP address, a source port, a destination IP address, a destination port, and a transport layer protocol.

14. The method according to claim 3, wherein the message information learning result comprises information obtained by the master IP core through the self-learning operation, and the information comprises at least one of: a source IP address, a source port, a destination IP address, a destination port, a transport layer protocol, and a storage location of the corresponding information in a message processing information table.

15. The method according to claim 5, wherein the information updating request at least contains content requested by a user for updating and a storage location of the content in a message processing information table.

16. The method according to claim 1, further comprising:
setting a second preset strategy, wherein the second preset strategy is used for enabling the Ethernet switching chip to actively report a running state in a running process of a switch.

17. The method according to claim 16, wherein the running state is a running state of each IP core.

18. The method according to claim 17, wherein the running state of each IP core comprises: statistical information on the number of messages sent and received by ports of each IP core.

19. The method according to claim 17, wherein for each IP core, the running state is used as a dedicated information table of a corresponding IP core in a form of a state information table.

20. The method according to claim 19, comprising:
actively sending, by the master IP core, the state information table of the master IP core to the processor according to a period contained in the second preset strategy, and sending, by the master IP core to the processor, the received state information table of the corresponding slave IP core sent by each slave IP core.

* * * * *